(12) United States Patent
McGowan

(10) Patent No.: US 9,175,585 B2
(45) Date of Patent: Nov. 3, 2015

(54) FLUID LEVEL DETECTION DEVICE WITH STABILIZER

(71) Applicant: GM GLOBAL TECHNOLOGY OPERATIONS LLC, Detroit, MI (US)

(72) Inventor: Sean M McGowan, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 245 days.

(21) Appl. No.: 13/901,674

(22) Filed: May 24, 2013

(65) Prior Publication Data

US 2014/0345977 A1 Nov. 27, 2014

(51) Int. Cl.

| | |
|---|---|
| F16N 31/00 | (2006.01) |
| F01M 11/12 | (2006.01) |
| G01F 23/62 | (2006.01) |
| B60K 35/00 | (2006.01) |
| G01F 23/30 | (2006.01) |
| G01F 23/70 | (2006.01) |
| G01F 23/74 | (2006.01) |
| G01F 23/76 | (2006.01) |
| H01H 35/18 | (2006.01) |

(52) U.S. Cl.
CPC .............. *F01M 11/12* (2013.01); *B60K 35/00* (2013.01); *G01F 23/303* (2013.01); *G01F 23/62* (2013.01); *G01F 23/706* (2013.01); *G01F 23/74* (2013.01); *G01F 23/76* (2013.01); *H01H 35/18* (2013.01)

(58) Field of Classification Search
CPC .................. F01M 11/10; F01M 11/12; F01M 2011/1453; G01F 23/72; G01F 23/74; G01F 23/303

See application file for complete search history.

(56) References Cited

U.S. PATENT DOCUMENTS

| | | | | |
|---|---|---|---|---|
| 2,102,615 | A | * | 12/1937 | Cubete ............................ 73/319 |
| 3,258,968 | A | * | 7/1966 | Woodcock ....................... 73/308 |
| 3,714,823 | A | * | 2/1973 | Wilkens et al. ............. 73/114.52 |
| 4,057,700 | A | * | 11/1977 | Nakashima ................. 200/84 C |
| 4,256,069 | A | * | 3/1981 | Masuda et al. ............. 123/196 S |
| 4,638,663 | A | * | 1/1987 | Seelhorst ......................... 73/313 |
| 4,748,300 | A | * | 5/1988 | Anderson ................... 200/84 C |
| 5,083,115 | A | * | 1/1992 | Kamiya ......................... 340/624 |
| 5,687,687 | A | * | 11/1997 | Trueblood et al. ......... 123/196 S |
| 5,744,701 | A | * | 4/1998 | Peterson et al. ............... 73/49.2 |
| 6,105,611 | A | * | 8/2000 | Ando et al. .................... 137/558 |
| 7,688,193 | B2 | * | 3/2010 | Nishida et al. ............. 340/450.3 |

* cited by examiner

*Primary Examiner* — William E Dondero
*Assistant Examiner* — Minh Truong
(74) *Attorney, Agent, or Firm* — Quinn Law Group, PLLC

(57) ABSTRACT

A fluid level detection device for a chamber containing a fluid includes a sensor configured to indicate one of at least two states; a first state when a present fluid level in the chamber is above a threshold level with respect to a chamber floor, and a second state when the present fluid level in the chamber is below the threshold level. A stabilizer is configured to at least partially surround the sensor. The stabilizer includes a base portion and a plurality of sidewalls defining a storage well configured to store a portion of the fluid around the sensor. The stabilizer is configured to prevent the sensor from indicating the second state when a present fluid volume in the chamber is above a predetermined minimum amount. The stabilizer is configured to prevent the sensor from indicating a false "low fluid" state during a non-stable event.

20 Claims, 2 Drawing Sheets

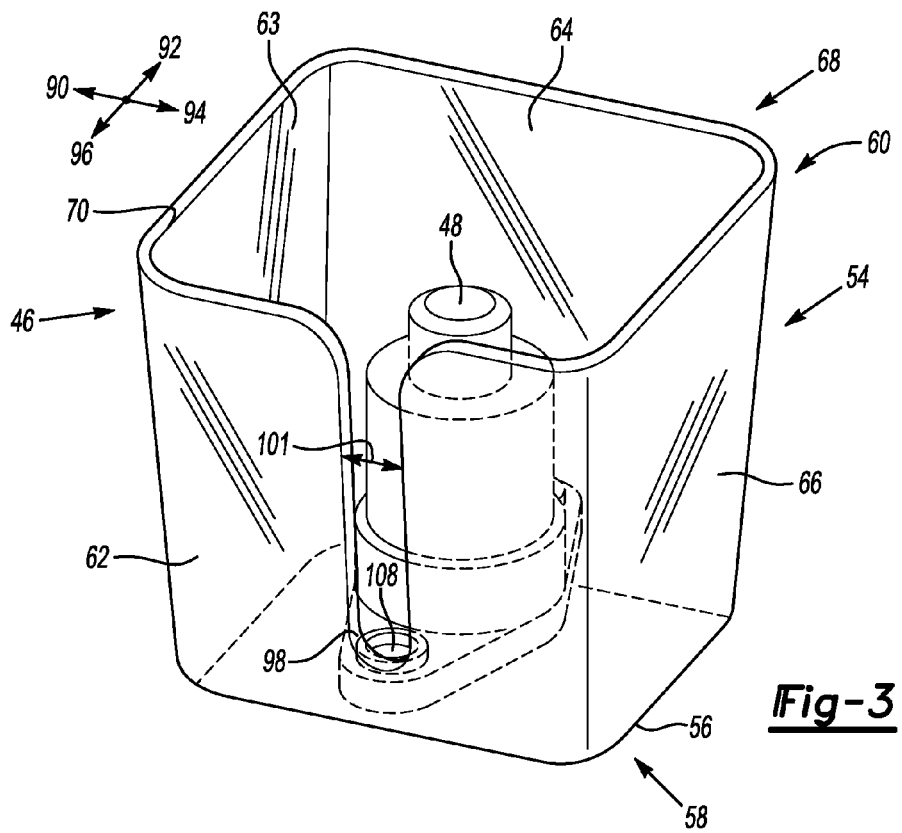
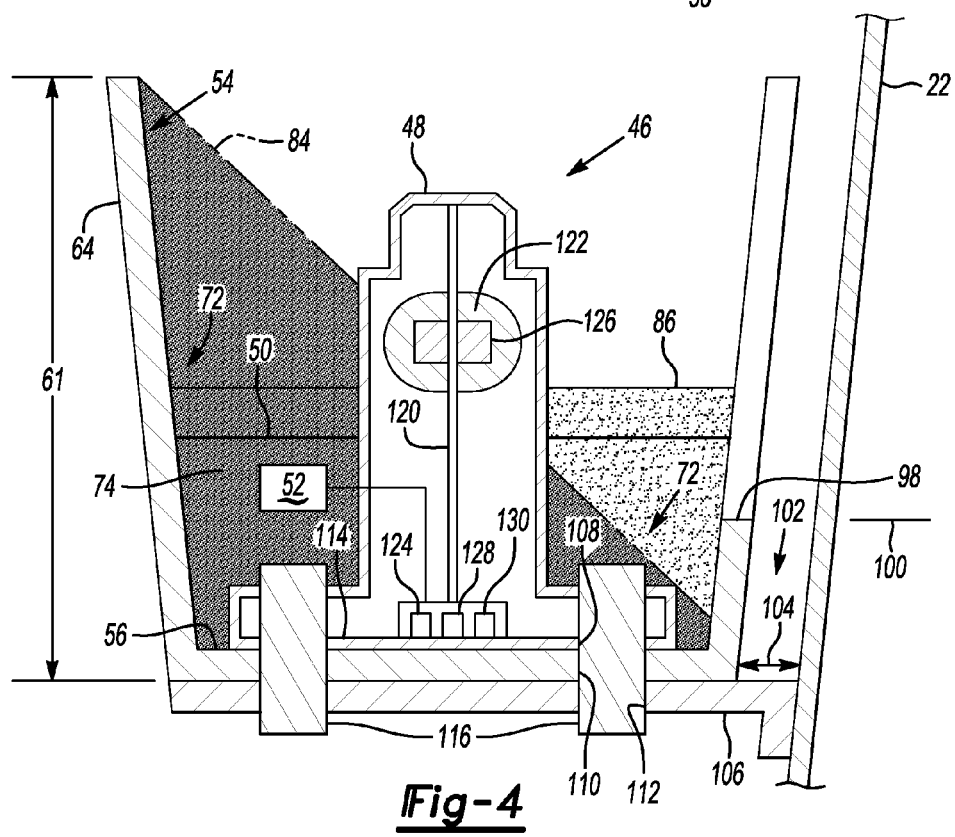

FLUID LEVEL DETECTION DEVICE WITH STABILIZER

TECHNICAL FIELD

The present invention relates generally to a fluid level detection device, and more particularly, to a fluid level detection device having a stabilizer.

BACKGROUND

Engine oil is typically circulated in the engine to lubricate moving components in the engine. Typically, an oil pump pumps the engine oil from an oil sump to various other locations within the engine. Gravity causes engine oil to return to the oil sump. When the engine is switched off, the oil pump no longer pumps the engine oil, and therefore a substantial portion of the engine oil returns to and remains in the oil sump. The engine oil must be maintained above a certain level to prevent damage to the engine components while the engine is running. An oil level sensor is generally employed to ensure that the engine oil is maintained above a minimum level. During a non-stable event, such as rapid acceleration or braking, movement of the engine oil may cause the oil level sensor to falsely indicate that the engine oil is below the minimum level.

SUMMARY

A fluid level detection device, for a chamber containing a fluid and defining a chamber floor, includes a sensor. The sensor is configured to indicate one of at least two states; a first state when a present fluid level in the chamber is above a threshold level with respect to the chamber floor, and a second state when the present fluid level in the chamber is below the threshold level. A stabilizer is configured to at least partially surround the sensor. The stabilizer includes a base portion and a plurality of sidewalls defining a storage well configured to store a portion of the fluid around the sensor.

The stabilizer is configured to prevent the sensor from indicating the second state when a present fluid volume in the chamber is above a predetermined minimum amount. Stated differently, the stabilizer is configured to prevent the sensor from indicating a false "low fluid" state during a non-stable event. A non-stable event may be any event that causes the fluid to be jostled or thrown around and includes, but is not limited to, a rapid right turn, a rapid left turn, sudden or rapid braking or acceleration.

Each of the plurality of sidewalls may extend higher relative to the chamber floor than the threshold level. The plurality of sidewalls includes a first sidewall defining a drain slot extending from the second end of the stabilizer to a slot level defined with respect to the chamber floor. The slot level of the first sidewall is configured to be less than the threshold level. The drain slot is configured to allow the portion of the fluid in the storage well to drain out of the storage well when the present fluid volume in the chamber is below the predetermined minimum volume.

Each of the plurality of sidewalls of the stabilizer may be substantially perpendicular to the base portion of the stabilizer. The sensor may be configured to be substantially parallel to each of the plurality of sidewalls of the stabilizer.

The sensor may include a guide and a vertically movable float operatively connected to the guide. The float is configured to travel along the guide as the present fluid level in the chamber changes. A magnetic element may be fixedly connected to the float. A Hall effect sensor is configured to sense the position of the float by detecting the location of the magnetic element.

The fluid level detection device may be operatively connected to an oil pan in a vehicle engine. The oil pan includes a chamber floor and a first and a second chamber wall extending away from the chamber floor. The chamber floor and the first and second chamber walls define a chamber configured for collecting the fluid therein. The first chamber wall extends a first height relative to the chamber floor. The second chamber wall extends a second height relative to the chamber floor such that the first height is greater than the second height.

The fluid level detection device may be operatively connected to the oil pan through a mounting member. The sensor may be rigidly operatively connected to the mounting member. The mounting member may be integrally formed with the chamber of the oil pan. Respective coincident apertures may be defined in a seat portion of the sensor, the base portion of the stabilizer member and the mounting member. A fastener may extend through the respective coincident apertures. The fastener may be configured to connect the sensor, the stabilizer member and the mounting member.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic perspective view of the fluid level detection device of FIG. 2 (with the oil pan removed); and FIG. 4 is an enlarged view of portion 4 of FIG. 2.

DESCRIPTION

Figure 1:
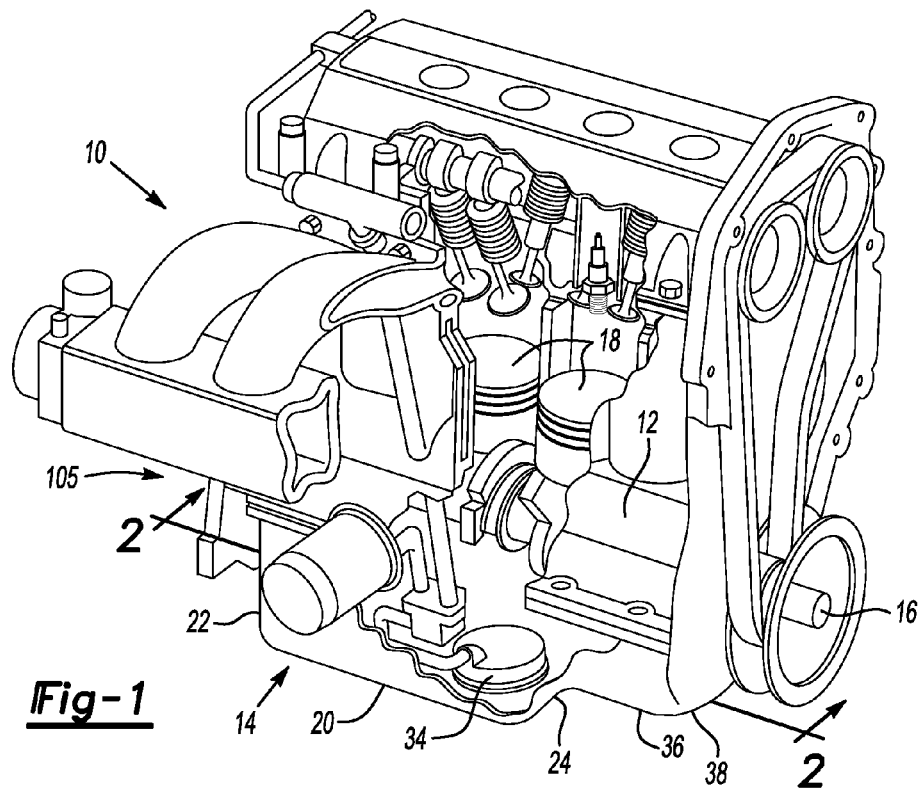
FIG. 1 is a schematic perspective illustration of a cutaway view of an internal combustion engine including an oil pan attached hereto.

Referring to the drawings, wherein like reference numbers correspond to like or similar components throughout the several figures, an internal combustion engine 10 is shown in FIG. 1. The engine 10 includes an engine block 12. An oil pan 14 may be attached to the bottom of the engine block 12. Referring to FIG. 1, the engine 10 also includes a crankshaft 16, pistons 18 and various other components known to those skilled in the art.

Figure 2:
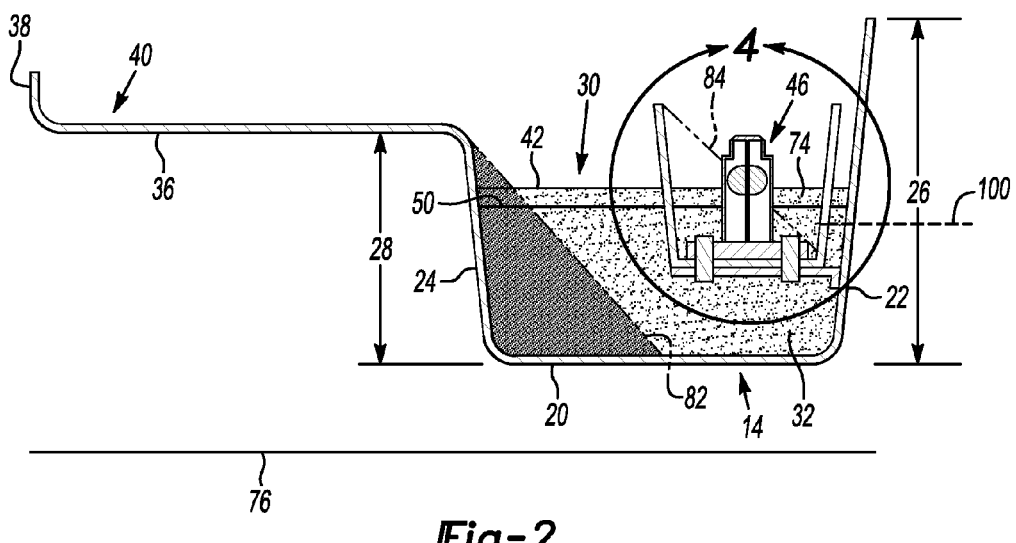
FIG. 2 is a schematic sectional view of the oil pan of FIG. 1 with a fluid level detection device, taken through axis 2-2 in FIG. 1.

FIG. 2 is a schematic sectional view of the oil pan 14, taken through axis 2-2 in FIG. 1. Referring to FIGS. 1-2, the oil pan 14 includes a chamber floor 20 and first and second chamber walls 22, 24 extending away from chamber floor 20. Referring to FIG. 2, the first chamber wall 22 extends a first height 26 relative to the chamber floor and the second chamber wall 24 extends a second height 28 relative to the chamber floor 20. In the embodiment shown, the first height 26 is greater than the second height 28.

Referring to FIG. 2, the chamber floor 20 and the first and second chamber walls 22, 24 define a chamber 30 configured for collecting a fluid 32. The fluid may be engine oil or any other fluid. Referring to FIG. 1, the engine may include a fluid pick-up apparatus 34 for pumping the fluid 32 to various other locations within the engine. Referring to FIGS. 1-2, the oil pan 14 may include a reservoir floor 36 that is contiguous with the second chamber wall 24, and a reservoir wall 38 contiguous with the reservoir floor 36. The reservoir floor 36 and reservoir wall 38 define a reservoir 40 that is shallow relative to or in comparison to the chamber 30. Referring to FIG. 2, the fluid 32 in the chamber 30 defines a present fluid volume V and a present fluid level 42. The present fluid volume V is defined as the current or real-time volume of the fluid 32 in the chamber 30. The present fluid level 42 is defined as the current or real-time height of the fluid 32 relative to or with respect to the chamber floor 20.

Referring to FIG. 2, a fluid level detection device 46 may be operatively connected to the oil pan 14. FIG. 3 is a schematic perspective view of the fluid level detection device 46, with the oil pan 14 removed for clarity. FIG. 4 is an enlarged view of portion 4 of FIG. 2, showing the fluid level detection device 46 and a portion of the first chamber wall 22.

Referring to FIGS. 3-4, the fluid level detection device 46 includes a sensor 48 for detecting the present fluid level 42 in the chamber. The fluid 32 in the chamber 30, such as engine oil, must generally be maintained above a threshold level 50 (shown in FIGS. 2 and 4) to prevent damage to the engine components while the engine 10 is running.

The sensor 48 is configured to indicate one of at least two states, a first state when the present fluid level 42 in the chamber 30 is above the threshold level 50 relative to the chamber floor 20, and a second state when the present fluid level 42 in the chamber 30 is below the threshold level 50. Referring to FIG. 4, the sensor 48 may be operatively connected to a controller 52 (such as the vehicle engine control module). The sensor 48 may be configured to send a signal to the controller 52, i.e. send out a "low fluid" signal, when the present fluid level 42 in the chamber 30 goes below the threshold level 50.

Referring to FIGS. 2-4, a stabilizer 54 is configured to at least partially surround the sensor 48. The stabilizer 54 may be made out of sheet metal, plastic or any other suitable material. Referring to FIG. 3, the stabilizer 54 includes a base portion 56 (also shown in FIG. 4) at a first end 58 and a plurality of sidewalls 60 extending away from the base portion 56.

Referring to FIG. 3, the plurality of sidewalls 60 may include a first sidewall 62, second sidewall 63, third sidewall 64 and fourth sidewall 66. Referring to FIG. 3, a second end 68 of the stabilizer 54 defines an opening 70 between the sidewalls 60. The plurality of sidewalls 60 and the base portion 56 to define a storage well 72 configured to store a portion 74 of the fluid 32 around the sensor 48.

Referring to FIG. 2, in the absence of any non-stable events, the fluid 32 in the chamber 30 has a profile that is substantially parallel to a ground level 76. During a non-stable event, the fluid 32 in the chamber 30 may be jostled around or moved around, causing a change in the fluid profile. A non-stable event may be any event that causes the fluid 32 to be jostled or thrown around and includes, but is not limited to, a rapid right turn, a rapid left turn, sudden or rapid braking or acceleration. Referring to FIG. 2, an example of a non-stable first fluid profile 82 for the chamber 30 is shown. Referring to FIG. 4, an example of a non-stable second fluid profile 84 for the storage well 72 is shown. It is to be appreciated that the first and second fluid profiles 82, 84 are examples only and there may be many different profiles formed by the fluid 32 during a non-stable event.

Movement of fluid 32 during a non-stable event may cause the sensor 48 to falsely indicate that the present fluid level 42 is below the threshold level 50 in the chamber 30. Referring to FIG. 4, the sensor 48 reads the present fluid level 42 to be at line 86 for the second fluid profile 84. Since line 86 is above the threshold level 50, the sensor 48 does not indicate a false low reading. The stabilizer 54 is configured to prevent the sensor 48 from indicating the second state (that is, sending a "low fluid" signal) when the present fluid volume V in the chamber 30 is above a predetermined minimum volume by pooling the portion 74 of the fluid 32 in the storage well 72. The predetermined minimum volume corresponds to the volume of fluid 32 in the chamber 30 when the present fluid level 42 is the same as the threshold level 50 and the present fluid level 42 has a profile that is substantially parallel to the ground level 76. In other words, the present fluid volume V being below the predetermined minimum volume M corresponds to a "true" low fluid level, as opposed to movement of the fluid 32 away from the sensor 48 due to external forces.

Referring to FIGS. 3-4, the sidewalls 60 define a sidewall height 61. In one example, the sidewall height 61 is approximately between 55 and 90 mm. The sidewalls 60 are configured to extend higher (relative to the chamber floor 20) than the threshold level 50. This allows the storage well 72 (defined by the base portion 56 and sidewalls 60) to trap sufficient amounts of the portion 74 of fluid 32 around the sensor 48 during a non-stable event. During a non-stable event, if the fluid 32 is thrown in directions 90, 92 and 94, respectively, the second, third and fourth sidewalls 63, 64, 66 act as a barrier to prevent the portion 74 of fluid 32 in the storage well 72 from flowing out. Similarly, if the fluid 32 is thrown in direction 96, the first chamber wall 22 acts as a barrier to keep sufficient fluid around the sensor 48 in order to prevent the sensor 48 from giving a false low reading.

Referring to FIGS. 3-4, the stabilizer 54 surrounding the sensor 48 includes a drain slot 98 defined by the first sidewall 62 and extending from the second end 68 of the stabilizer 54 to a slot level 100. Referring to FIGS. 2 and 4, the slot level 100 is defined relative or with respect to the chamber floor 20. Referring to FIG. 4, the slot level 100 is configured to be less than the threshold level 50 in order to allow the portion 74 of fluid 32 to drain out of the storage well 72 when the present fluid volume V in the chamber 30 is below the predetermined minimum volume. The drain slot 98 is configured to allow the portion 74 of fluid 32 to equalize with the fluid 32 in the chamber 30 in the absence of a non-stable event. In other words, the drain slot 98 allows a true low level reading to be obtained when the present fluid level 42 goes below the threshold level 50 and the present fluid volume V is below the predetermined minimum volume. Referring to FIG. 3, the width 101 of the drain slot 98 is shown. In one example, the width 101 of the drain slot 98 is between approximately 5 and 15 mm.

Referring to FIG. 4, the drain slot 98 may be configured to face and be in substantially close proximity to the first chamber wall 22. Referring to FIG. 2, the first and second chamber walls 22, 24 extend a first and second height 26, 28 relative to the chamber floor 20, the first height 26 being higher than the second height 28. The fluid portion 74 draining out of the storage well 72 may flow out through a drain passage 102 defined between the drain slot 98 and the first chamber wall 22. The drain slot 98 may be spaced from the first chamber wall 22 by a first distance 104. In one example, the first distance 104 is between approximately 5 mm and 15 mm.

Referring to FIG. 4, the fluid level detection device 46 may be operatively connected to a portion of the oil pan 14 (such as the first chamber wall 22) through a mounting member 106. Alternatively, the fluid level detection device 46 may be rigidly mounted to an upper tray (not shown) in the oil pan 14. The mounting member 106 may be integrally formed with the chamber 30. The mounting member 106 may be a stamped metal bracket or a cast metal piece. Referring to FIG. 4, the sensor 48 includes a seat portion 114 that is rigidly operatively connected to the mounting member 106, with the base portion 56 of the stabilizer 54 in between the sensor 48 and the mounting member 106. Referring to FIG. 4, respective coincident apertures 108, 110, 112 may be defined in the seat portion 114 of the sensor 48, the base portion 56 of the stabilizer 54 and the mounting member 106. Referring to FIG. 4, a fastener 116, such as a bolt, may extend through the respective coincident apertures 108, 110, 112 and be configured to connect the sensor 48, the stabilizer 54 and the mounting member 106. Any other method of operatively connecting the fluid level detection device 46 to the oil pan 14 may be employed.

Referring to FIG. 3, each of the plurality of sidewalls 60 of the stabilizer 54 may be substantially perpendicular to the base portion 56 of the stabilizer 54. The sensor 48 may be configured to extend in a direction substantially parallel to each of the plurality of sidewalls 60 (such as sidewall 64 also shown in FIG. 4) of the stabilizer 54.

The sensor 48 may employ any suitable method of detecting the present fluid level 42 in the chamber 30, including but not limited to the methods described below. Referring to FIG. 4, the sensor 48 may include a guide 120 and a vertically movable float 122 operatively connected to the guide 120. The float 122 is configured to travel along the guide 120 as the present fluid level 42 in the chamber 30 changes. Referring to FIG. 4, the sensor 48 may include a Hall effect sensor 124 configured to sense or detect a position of the float 122 by detecting the location of a magnetic element 126 that is fixedly connected to the float 122. As the float 122 moves along the guide 120, the magnetic element 126 mounted to the float 122 also moves, thereby altering the local magnetic field. As is known to those of ordinary skill in the art, the Hall effect sensor 124 varies its output voltage in response to changes in magnetic field.

In another embodiment, the sensor 48 may include an optical proximity sensor 128 that detects the position of the float 122, without requiring a magnetic element 126. In another embodiment, the sensor 48 may include a mechanical switch 130 that switches between two states, i.e. turns on/off, as the float moves past the threshold level. Referring to FIG. 4 and as previously noted, the sensor 48 may be configured to send a signal to the controller 52 when the present fluid level 42 in the chamber 30 is below the threshold level 50.

Referring to FIG. 1, in one example, the engine 10 may be configured to be mounted longitudinally such that the crankshaft 16 is oriented along the long axis (front to back) of a vehicle (not shown). In this case, the drain slot 98 may be configured to be proximate to the rear 105 of the engine block 12. In another example, the engine 10 may be configured to be mounted in a transverse orientation such that the crankshaft 16 is oriented along the short axis (left to right) of a vehicle (not shown). In this case, the drain slot 98 may be positioned to the side of the engine oil pan 14 (toward rear of the vehicle).

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An engine comprising:
   an engine block;
   an oil pan operatively connected to the engine block, the oil pan including a chamber floor, a first chamber wall and a second chamber wall defining a chamber configured for collecting a fluid therein;
   wherein the fluid in the chamber defines a present fluid volume and a present fluid level relative to the chamber floor;
   a fluid level detection device operatively connected to the oil pan, the fluid level detection device including:
      a sensor configured to indicate one of at least two states, a first state when the present fluid level in the chamber is above a threshold level, and a second state when the present fluid level in the chamber is below the threshold level;
      a stabilizer configured to at least partially surround the sensor, the stabilizer having a first and second end;
      wherein the stabilizer includes a base portion at the first end and a plurality of sidewalls each contiguous with the base portion, each of the plurality of sidewalls extending higher than the threshold level;
      wherein the plurality of sidewalls includes first, second, third and fourth sidewalls, the first sidewall being contiguous with both the second and fourth sidewalls;
   wherein the third sidewall is contiguous with both the second and fourth sidewalls;
   wherein the first sidewall defines a drain slot extending from a slot level to the second end of the stabilizer, such that the drain slot opens into the second end of the stabilizer;
   wherein the plurality of sidewalls and the base portion define a storage well configured to store a portion of the fluid around the sensor; and
   wherein the stabilizer is configured to prevent the sensor from indicating the second state when the present fluid volume in the chamber is above the predetermined minimum volume.

2. The engine of claim 1, wherein the drain slot is configured to be proximate to a rear of the engine block.

3. The engine of claim 1, further comprising:
   a mounting member operatively connected to one of the first and second chamber walls of the oil pan, the mounting member being configured to be substantially parallel to the chamber floor of the oil pan; and
   wherein the fluid level detection device is operatively connected to the mounting member.

4. The engine of claim 1, wherein the stabilizer is configured to prevent the sensor from indicating the second state during a non-stable event.

5. A fluid level detection device for a chamber containing a fluid and defining a chamber floor, the device comprising:
   a sensor operatively connected to the chamber;
   wherein the fluid in the chamber defines a present fluid volume and a present fluid level relative to the chamber floor;
   wherein the sensor is configured to indicate one of at least two states, a first state when the present fluid level in the chamber is above a threshold level with respect to the chamber floor, and a second state when the present fluid level in the chamber is below the threshold level;
   a stabilizer configured to at least partially surround the sensor, the stabilizer having a first and second end;
   wherein the stabilizer includes a base portion at the first end and a plurality of sidewalls each contiguous with the base portion, the plurality of sidewalls including first, second, third and fourth sidewalls;
   wherein the first sidewall is contiguous with both the second and fourth sidewalls;
   wherein the third sidewall is contiguous with both the second and fourth sidewalls:

wherein the first sidewall defines a drain slot extending from a slot level to the second end of the stabilizer, such that the drain slot opens into the second end of the stabilizer;

wherein the plurality of sidewalls and the base portion define a storage well configured to store a portion of the fluid around the sensor; and wherein the stabilizer is configured to prevent the sensor from indicating the second state when the present fluid volume in the chamber is above a predetermined minimum volume.

6. The device of claim 5, wherein:

the slot level is configured to be less than the threshold level; and the drain slot is configured to allow the portion of the fluid in the storage well to drain out of the storage well when the present fluid volume in the chamber is below the predetermined minimum volume.

7. The device of claim 5, wherein each of the plurality of sidewalls extends higher with respect to the chamber floor than the threshold level.

8. The device of claim 5, wherein each of the plurality of sidewalls of the stabilizer is substantially perpendicular to the base portion of the stabilizer.

9. The device of claim 5, wherein the sensor is configured to be substantially parallel to each of the plurality of sidewalls of the stabilizer; and wherein the stabilizer is configured to prevent the sensor from indicating the second state during a non-stable event.

10. The device of claim 5, further comprising:

a mounting member integrally formed with the chamber; and wherein the sensor is rigidly operatively connected to the mounting member.

11. The device of claim 5, wherein the sensor includes a seat portion, and further comprising:

a mounting member operatively connected to the chamber, the sensor being rigidly operatively connected to the mounting member;

respective coincident apertures defined in the seat portion of the sensor, the base portion of the stabilizer and the mounting member; and a fastener extending through the respective coincident apertures and configured to connect the sensor, the stabilizer and the mounting member.

12. The device of claim 5, wherein the sensor includes:

a guide;

a vertically movable float operatively connected to the guide, the float being configured to travel along the guide as the present fluid level in the chamber changes;

a magnetic element fixedly connected to the float; and at least one Hall effect sensor configured to sense a position of the float by detecting a location of the magnetic element.

13. An oil pan comprising:

a chamber floor;

a first and a second chamber wall extending away from the chamber floor, the chamber floor and the first and second chamber walls defining a chamber configured for collecting a fluid therein;

wherein the fluid in the chamber defines a present fluid volume and a present fluid level relative to the chamber floor;

a fluid level detection device operatively connected to the first chamber wall, the fluid level detection device including:

a sensor configured to indicate one of at least two states, a first state when the present fluid level in the chamber is above a threshold level, and a second state when the present fluid level in the chamber is below the threshold level;

a stabilizer configured to at least partially surround the sensor, the stabilizer having a first and second end;

wherein the stabilizer includes a base portion at the first end and a plurality of sidewalls each contiguous with the base portion, the plurality of sidewalls including first, second, third and fourth sidewalls;

wherein the first sidewall is contiguous with both the second and fourth sidewalls;

wherein the third sidewall is contiguous with both the second and fourth sidewalls;

wherein the first sidewall defines a drain slot extending from a slot level to the second end of the stabilizer, such that the drain slot opens into the second end of the stabilizer;

wherein the plurality of sidewalls and the base portion define a storage well configured to store a portion of the fluid around the sensor; and wherein the stabilizer is configured to prevent the sensor from indicating the second state when the present fluid volume in the chamber is above a predetermined minimum volume.

14. The oil pan of claim 13, wherein:

the first chamber wall extends a first height relative to the chamber floor; and the second chamber wall extends a second height relative to the chamber floor, the first height being greater than the second height.

15. The oil pan of claim 13, wherein each of the plurality of sidewalls extends higher with respect to the chamber floor than the threshold level.

16. The oil pan of claim 13, wherein each of the plurality of sidewalls of the stabilizer is substantially perpendicular to the base portion of the stabilizer.

17. The oil pan of claim 13, wherein the sensor includes a seat portion, and further comprising:

a mounting member operatively connected to the chamber, the sensor being rigidly operatively connected to the mounting member;

respective coincident apertures defined in the seat portion of the sensor, the base portion of the stabilizer and the mounting member; and a fastener extending through the respective coincident apertures and configured to connect the sensor, the stabilizer and the mounting member.

18. The oil pan of claim 13, wherein:

the slot level of the first sidewall is configured to be less than the threshold level; and the drain slot is configured to allow the portion of the fluid in the storage well to drain out of the storage well when the present fluid volume in the chamber is below the predetermined minimum volume.

19. The oil pan of claim 18, further comprising:

a drain passage defined between the drain slot and the first chamber wall, such that the portion of the fluid draining out of the storage well flows through the drain passage; and wherein the drain slot is spaced from the first chamber wall by a first distance.

20. The oil pan of claim 18, wherein the first distance is between approximately 5 mm and 15 mm.

* * * * *